United States Patent [19]

Schmidt et al.

[11] Patent Number: 4,857,560

[45] Date of Patent: Aug. 15, 1989

[54] REACTION PRODUCTS USEFUL AS CATALYSTS IN THE PRODUCTION OF ISOCYANATE-BASED PLASTICS

[75] Inventors: Manfred Schmidt, Dormagen; Claus-Dieter Sommerfeld, Much, both of Fed. Rep. of Germany; Christoph Prolingheuer, Pittsburgh, Pa.; Walter Klän, Leverkusen, Fed. Rep. of Germany

[73] Assignee: Bayer Aktiengesellschaft, Bayerwerk, Fed. Rep. of Germany

[21] Appl. No.: 217,528

[22] Filed: Jul. 11, 1988

Related U.S. Application Data

[62] Division of Ser. No. 18,240, Feb. 24, 1987.

[30] Foreign Application Priority Data

Mar. 8, 1986 [DE] Fed. Rep. of Germany ....... 3607667
Mar. 27, 1986 [DE] Fed. Rep. of Germany ....... 3610434

[51] Int. Cl.[4] ............................................. C08G 18/14
[52] U.S. Cl. .................................... 521/103; 521/105; 528/52; 528/53
[58] Field of Search ................. 521/103, 105; 528/52, 528/53

[56] References Cited

U.S. PATENT DOCUMENTS

3,193,515 7/1965 Mascioli ................................ 260/2.5
4,425,445 1/1984 White ................................... 521/105

FOREIGN PATENT DOCUMENTS

0004309 10/1979 European Pat. Off. .
0063930 11/1982 European Pat. Off. .
 886306 8/1953 Fed. Rep. of Germany .
0794051 4/1958 United Kingdom .
0839185 6/1960 United Kingdom .
1083394 9/1967 United Kingdom .
1455695 11/1976 United Kingdom .
8303415 10/1985 World Int. Prop. O. .

*Primary Examiner*—Maurice J. Welsh
*Attorney, Agent, or Firm*—Gene Harsh; Joseph C. Gil; Richard E. L. Henderson

[57] ABSTRACT

A reaction product is formed from a tertiary amine and an acid mixture of (i) boric acid and (ii) a carboxylic acid. The reaction components are generally used in quantities such that the molar ratio of tertiary amine to acid mixture is from 1:0.1 to 1:10. The molar ratio of the boric acid to the carboxylic acid in the acid mixture is generally from 1:100 to 1:0.01. These reaction products are particularly useful as catalysts in the production of isocyanate addition products.

13 Claims, No Drawings

REACTION PRODUCTS USEFUL AS CATALYSTS IN THE PRODUCTION OF ISOCYANATE-BASED PLASTICS

This application is a division, of application Ser. No. 07/018,240 filed Feb. 24, 1987.

BACKGROUND OF THE INVENTION

This invention relates to new reaction products based on tertiary amines which may be used as catalysts in the production of isocyanate-based plastics.

The use of salt catalysts based on tertiary amines and mineral acids or organic mono- and polycarboxylic acids in the production of polyurethane foam is already known.

British Pat. No. 1,083,394 describes catalysts made from tertiary amines and mineral acids (such as hydrochloric acid, hydrogen bromide, sulfuric acid, nitric acid and phosphoric acid) with from 0.015 to 0.80 equivalents of acid being used for each equivalent of amine. U.S. Pat. No. 3,193,515 describes the use of salts of boric acid esterified with glycols or glycerol with triethylene diamine as catalysts.

It is also known to use salt catalysts of tertiary amines and organic sulfonic acids and mono- and polycarboxylic acids (G.B. No. 839,185, G.B. No. 794,051, DE-OS No. 2,357,859 and DE-OS No. 2,812,256). These catalysts produce polyurethane foams generally showing adequate properties, but in many cases inadequate expansion power.

Now, rigid polyurethane foam systems in particular have to meet stringent requirements in regard to flow and expansion. This applies in particular to cases where housings having complicated flow paths (for example, refrigerator housings) or particularly long flow paths (for example, hollow bodies for surfboards) are to be filled with foam. In applications such as these, an increased amount of polyurethane reaction mixture is frequently required in order to adequately fill the housing to be filled with foam and to satisfy the physical property requirements of the rigid foam, such as compressive strength and dimensional stability at low temperatures when known salt catalysts or the corresponding tertiary amines are used.

Although expansion power may be increased by increasing the proportion of blowing agent, such as fluorinated hydrocarbons, this is often attended by the disadvantage of increased formation of troublesome bubbles of blowing agent at the surface of the foam and reduced stability in storage of the polyol formulation containing blowing agent.

SUMMARY OF THE INVENTION

It is one object of the present invention to provide catalysts which show improved power of expansion over the known catalysts. It is also an object of the invention to provide catalysts which are substantially or completely odorless, thus eliminating the problem of odor emission which normally arises with many tertiary amines.

These and other objects which will be apparent to those skilled in the art are accomplished by the reaction products obtained from a tertiary amine and a mixture of boric acid and a mono- and/or polycarboxylic acid, optionally in the presence of a solvent.

DETAILED DESCRIPTION OF THE INVENTION

The present invention relates to reaction products of a tertiary amine with a mixture of boric acid and mono- and/or polycarboxylic acid(s). In this invention, the preferred reaction products are those obtained at a molar ratio of tertiary amine(s) to the acids of from 1:0.1 to 1:10, preferably of from 1:0.9 to 1:1.2.

Other preferred reaction products are those obtained at a molar ratio of boric acid to mono- and/or polycarboxylic acid of from 1:100 to 1:0.01, preferably from 1:20 to 1:0.1 and more preferably from 1:15 to 1:1.

The tertiary amines $C_1$–$C_4$ peralkyl diethylene triamine, N,N'-tetraethylhexamethylene diamine, dimethylethanolamine, N-methyl-N'-dimethylaminoethyl piperazine, dimethylbenzylamine, N-dimethyl-N'-formyl ethylene diamine and/or triethylamine are examples of preferred tertiary amines. N,N-dimethylcyclohexylamine is particularly advantageous as the tertiary amine.

Preferred polycarboxylic acids are dicarboxylic acids, preferably succinic acid, glutaric acid, adipic acid and mixtures thereof with secondary products, particularly with the corresponding anhydrides, which accumulate during the production process.

The reaction products of the present invention are advantageously dissolved in solvents. A preferred solvent is glycerol or ethylene glycol.

The present invention also relates to the use of these reaction products as catalysts in the production of optionally cellular isocyanate-based plastics, particularly in the production of optionally cellular polyurethane plastics.

The reaction products according to the invention may be present as pure salt-like compounds or even in admixture with their starting compounds.

The reaction products according to the invention may be used without solvents. However, in the interests of better handling both during production and also during the use of the reaction products as catalysts, it is preferred to use a solvent. Suitable solvents include any organic and inorganic solvent in which the reaction product is soluble. Examples of such solvents include: water, dimethylsulfoxide, dimethylformamide, acetonitrile, dioxane, tetrahydrofuran, polyols, such as ethylene glycol, diethylene glycol and other homologs or methylethers thereof, propylene glycol, dipropylene glycol and other homologs or methylethers thereof. Preferred solvents are alcohols which can be incorporated in the polyurethane plastic, such as ethylene glycol, propylene glycol or glycerol.

The starting components listed below are examples of materials suitable for the production of the reaction products of the present invention.

Examples of appropriate tertiary amines include: triethylamine, tributylamine, N-methylmorpholine, N-ethylmorpholine, N,N,N',N'-tetramethylethylene diamine, pentamethyl diethylene triamine and higher homologs (DE-OS Nos. 2,624,527 and 2,624,528), 1,4-diazabicyclo-(2,2,2)-octane, N-methyl-N'-dimethylaminoethylpiperazine, bis-(dimethylaminoalkyl)-piperazines (DE-OS No. 2,636,787), N,N-diethylbenzylamine, bis-(N,N-diethylaminoethyl)-adipate, N,N,N',N'-tetramethyl-1,3-butane diamine, N,N-dimethyl-$\beta$-phenylethylamine, 1,2-dimethylimidazole, 2-methylimidazole, monocyclic and bicyclic amidines (DE-OS No. 1,720,633), bis-(dialkylamino)-alkylethers (US-PS No. 3,330,782, DE-AS No. 1,030,558, DE-OS Nos. 1,804,361 and 2,618,280) and tertiary amines containing amide groups (preferably formamide groups according to DE-OS Nos. 2,523,633 and 2,732,292). It is also possible to use known Mannich bases of secondary amines, such as dimethylamine, and aldehydes, preferably formaldehyde, and ketones, such as acetone, methylethylketone and cyclohexanone, and phenols, such as phenol, nonylphenol and bisphenol.

Examples of tertiary amines containing isocyanate-reactive hydrogen atoms are triethanolamine, triisopropanolamine, N-methyldiethanolamine, N-ethyldiethanolamine, N,N-dimethylethanolamine, reaction products thereof with alkylene oxides (such as propylene oxide and/or ethylene oxide) and also secondary-tertiary amines such as those disclosed in DE-OS No. 2,732,292.

Examples of suitable mono- and/or polycarboxylic acids include: monocarboxylic acids such as formic acid, acetic acid, halogenated acetic acids such as trifluoro-, chloro-, dichloro-, trichloro-, bromoacetic acid, propionic acid, halogenated propionic acids, such as 2-chloro-, 3-chloro-, 2,2,3-trichloro-, 2-bromopropionic acid, butyric acid, i-butyric acid, pentanoic acid and isomers thereof, hexanoic acid and isomers thereof, 2-ethylhexanoic acid, dodecanoic acid, tetradecanoic acid, hexadecanoic acid, octadecanoic acid, unsaturated monocarboxylic acids such as acrylic acid, butanoic acid, methacrylic acid, undecenoic acid, oleic acid, sorbic acid, linoleic acid; dicarboxylic acids such as oxalic acid, malonic acid, succinic acid, glutaric acid, adipic acid, suberic acid, azelaic acid, trimethyl adipic acid, sebacic acid, dodecane diacid, fumaric acid, itaconic acid; and polycarboxylic acids such as butane tetracarboxylic acid; carboxylic acids containing functional groups such as lactic acid, ricinoleic acid, bis-(hydroxymethyl)-propionic acid, hydroxybutane diacid, dihydroxybutane diacid, citric acid, mucic acid, isocyclic carboxylic acids such as cyclohexane carboxylic acid, cyclohexane carboxylic acid, benzoic acid, chloro-, dichloro-, bromo-, nitro-, chloronitro- and dinitrobenzoic acid, phenyl-acetic acid, tolylic acid and other alkylated benzoic acids, naphthalene dicarboxylic acid, "Het" acid, benzene dicarboxylic acid, phenylphthalic acid, benzene tri- and tetracarboxylic acid, hydroxybenzoic acid and other substituted benzoic acids.

These carboxylic acids may be used either as pure substances or as mixtures such as those which accumulate during production on an industrial scale and contain impurities such as the corresponding anhydrides.

The solventless preparation of the reaction products of the present invention is carried out simply by combining amine, boric acid and mono- and/or polycarboxylic acid, followed by stirring at elevated temperatures for homogenization. The reaction products are either viscous liquids or solids at room temperature (see Example 1).

When the reaction products are solids, the acid mixture may even be initially introduced in the form of a solution and the salt precipitated by dropwise addition of the amine and filtered off for isolation.

To make the new reaction products easier to prepare and better to use, it is preferred to prepare them in the presence of a solvent. To this end, the mixture of boric acid and carboxylic acid is initially introduced in the required solvent at any temperature, preferably 0° to 150° C. and more preferably at 10° to 100° C., and the amine is added dropwise either in pure form or as a solution in the same solvent. This reaction is more or less exothermic, depending upon the amine used. For homogenization, the mixture is stirred for 2 to 5 hours at a temperature of from 10° to 150° C. and preferably at a temperature of from 30° to 100° C. The solutions thus obtained may be prepared in concentrations of from 1 to 99%, depending upon the solvent used, although concentrations of from 50 to 90% are preferred (Example 2).

The new reaction products are advantageously used as catalysts in the production of optionally cellular isocyanate-based plastics. The production of plastics such as these, which contain urethane and/or urea and/or isocyanurate and/or biuret and/or allophanate groups, is known and is described in detail, for example, in Kunststoff-Handbuch, Vol. VII, Polyurethane, edited by Vieweg and Hochtlen, Carl-Hanser-Verlag, Munich 1966, and in the edition by G. Oertel, Carl-Hanser-Verlag, Munich/Vienna, 1983.

The new reaction products are preferably used as catalysts in the production of optionally cellular polyurethane plastics.

The following materials may be used for the production of optionally cellular polyurethane plastics.

As the isocyanate starting component, aliphatic, cycloaliphatic, araliphatic, aromatic and heterocyclic polyisocyanates of the type described, for example, by W. Siefken in Justus Liebigs Annalen der Chemie, 562, pages 75 to 136, for example those corresponding to the formula $$Q(NCO)_n$$

in which n represents 2-4, preferably 2-3, and Q represents an aliphatic hydrocarbon radical containing from 2 to 18 (preferably from 6 to 10) carbon atoms, a cycloaliphatic hydrocarbon radical containing from 4 to 15 (preferably from 5 to 10) carbon atoms, an aromatic hydrocarbon radical containing from 6 to 15 (preferably from 6 to 13) carbon atoms or an araliphatic hydrocarbon radical containing from 8 to 15 (preferably from 8 to 13) carbon atoms such as the polyisocyanates described in DE-OS No. 2,832, 253, pages 10–11 may be used in the process of the present invention.

In general, it is preferred to use the commercially readily obtainable polyisocyanates such as 2,4- and 2,6-tolylene diisocyanate, and mixtures of these isomers ("TDI"); polyphenyl polymethylene polyisocyanates of the type obtained by phosgenation of aniline-formaldehyde condensates ("crude MDI") and polyisocyanates containing carbodiimide groups, urethane groups, allophanate groups, isocyanurate groups, urea groups or biuret groups ("modified polyisocyanates"), particularly modified polyisocyanates derived from 2,4- and/or 2,6-tolylene diisocyanate and from 4,4'- and/or 2,4'-diphenylmethane diisocyanate.

The starting components for the isocyanate addition products also include compounds containing at least two isocyanate-reactive hydrogen atoms and having a molecular weight of generally from 400 to 10,000. In addition to compounds containing amino groups, thio groups or carboxyl groups, such compounds are preferably compounds containing hydroxyl groups, more especially compounds containing from 2 to 8 hydroxyl groups, especially those having a molecular weight of from 1000 to 6000 and preferably from 2000 to 6000. Polycarbonates and polyester amides containing at least 2, generally from 2 to 8 and preferably from 2 to 6 hydroxyl groups, of the type known for the production of homogeneous and cellular polyurethanes are described, for example, in DE-OS No. 2,832,253, pages 11–18.

Optional starting components for isocyanate addition compounds include compounds containing at least two isocyanate-reactive hydrogen atoms and having a molecular weight of from 32 to 399. These compounds are compounds containing hydroxyl groups and/or amino groups and/or thiol groups and/or carboxyl groups, preferably compounds containing hydroxyl groups and/or amino groups which serve as chain-extending agents or crosslinking agents. These compounds generally contain from 2 to 8 and preferably from 2 to 4 isocyanate-reactive hydrogen atoms. Examples of these compounds can be found in DE-OS No. 2,832,253, pages 19–20.

Other optional auxiliaries and additives may also be employed. For example, water and/or readily volatile organic compounds may be used as blowing agents. Known catalysts may be used in quantities of up to 100 wt. % based on the quantity of catalyst used in accordance with the invention. Surface-active additives, such as emulsifiers and foam stabilizers may also be used. Reaction retarders, for example acid-reacting substances such as hydrochloric acid or organic acid halides; known cell regulators such as paraffins or fatty alcohols or dimethyl polysiloxanes; pigments; dyes; known flameproofing agents (for example, trischloroethylphosphate, tricresylphosphate); stabilizers against the effects of aging and weather; plasticizers; fungistatic and bacteriostatic agents and fillers, such as barium sulfate, kieselguhr, carbon black or whiting may also be employed.

These auxiliaries and additives which may optionally be used are described, for example, in DE-OS No. 2,732,292, pages 21–24.

Further examples of surface-active additives, foam stabilizers, cell regulators, reaction retarders, stabilizers, flameproofing agents, plasticizers, dyes, fillers, fungistatic and baceteriostatic agents which may optionally be used in accordance with the invention and information on the use of these additives and the way in which they work can be found in Kunststoff-Handbuch, Vol. VII, edited by Vieweg and Hochtlen, Carl-Hanser-Verlag, Munich 1966, for example on pages 103 to 113.

In the production of optionally cellular polyurethane plastics, the new reaction products are generally used as catalysts in a quantity of from 0.1 to 30 parts by weight, preferably in a quantity of from 0.5 to 20 parts by weight and more preferably in a quantity of from 1 to 8 parts by weight, based on 100 parts by weight of the compounds containing at least two isocyanate-reactive hydrogen atoms and having a molecular weight of from 400 to 10,000 and any optionally included corresponding compounds having a molecular weight of from 32 to 399.

The process for the production of polyurethane plastics is carried out as follows.

The reaction components are reacted by the one-shot process, the prepolymer process or the semiprepolymer process using machines such as those described for example in U.S. Pat. No. 2,764,565. Information on processing machines which may be used in accordance with the invention also can be found in Kunststoff-Handbuch, Vol. VII, edited by Vieweg and Hochtlen, Carl-Hanser-Verlag, Munich 1966, for example on pages 121 to 205.

In accordance with the present invention, it is possible to produce cold-hardening foams (see G.B. No. 1,162,517 and DE-OS No. 2,153,086). However, foams may also be produced by block foaming or by the known laminator process. The foams are preferably produced by the frothing process (see, for example, Kunststoff-Handbuch, Vol. VII, edited by Vieweg and Hochtlen, Carl-Hanser-Verlag, Munich 1966, pages 455, 456, 509, 534).

The polyurethane foams obtainable in accordance with the invention include flexible, semi-rigid and preferably rigid. They may be used, for example, for insulating refrigerators, for the production of spray insulations, overcoatings and as one-component foams.

The invention is further illustrated, but is not intended to be limited by the following examples in which all parts and percentages are by weight unless otherwise specified.

EXAMPLES

EXAMPLE 1

Production of various reaction products

The individual components, amine, boric acid and carboxylic acid were initially introduced into the reaction vessel and stirred at various temperatures ($\leq 180°$ C.) for homogenization. After cooling, resins showing low to high viscosity at room temperature were obtained (see Table 1).

EXAMPLE 2

To prepare the dissolved reaction products, the starting components were directly reacted in the solvents indicated at temperatures below 100° C. In every case, the reaction products accumulated in the form of easy-to-handle liquids (see Table 2).

EXAMPLE 3

90 g of a polyether having a hydroxyl number of 465 which had been obtained by addition of propylene oxide onto an aqueous sucrose solution, 10 g of a polyether having a hydroxyl number of 650 which had been obtained by addition of propylene oxide onto ethylene diamine, 2 g of a siloxane-polyether copolymer as foam stabilizer, 2 g of water and 2 g of dimethylcyclohexylamine were mixed.

100 g of this mixture were intensively mixed with 5 g of reaction product G (according to the invention) and 37 g of monofluorotrichloromethane as blowing agent using a laboratory stirrer.

This mixture was foamed with 148 g of crude 4,4'-diisocyanatodiphenylmethane. A rigid polyurethane foam was formed.

Foaming and physical data:
cream time (secs.): 14
gel time (secs.): 84
free gross density (kg/m$^3$): 20.5
cell pattern: fine

EXAMPLE 4

90 g of a polyether having a hydroxyl number of 465 which had been obtained by addition of propylene oxide onto an aqueous sucrose solution, 10 g of a polyether having a hydroxyl number of 650 which had been obtained by addition of propylene oxide onto ethylene diamine, 2 g of a siloxane-polyether copolymer as foam stabilizer, 2 g of water and 2 g of dimethylcyclohexylamine were mixed.

100 g of this mixture were intensively mixed with 2 g of the dissolved reaction product Y (according to the invention) and 35 g of monofluorotrichloromethane as blowing agent using a laboratory stirrer.

This mixture was foamed with 148 g of crude 4,4'-diisocyanatodiphenylmethane. A rigid polyurethane foam was formed.

Foaming and physical data:
cream time (secs.): 13
gel time (secs.): 80
free gross density (kg/m$^3$): 23
cell pattern: very fine

EXAMPLE 5

90 g of a polyether having a hydroxyl number of 465 which had been obtained by addition of propylene oxide onto an aqueous sucrose solution, 10 g of a polyether having a hydroxyl number of 650 which had been obtained by addition of propylene oxide onto ethylene diamine, 2 g of a siloxane-polyether copolymer as foam stabilizer, 2 g of water and 2 g of dimethylcyclohexylamine were mixed.

100 g of this mixture were intensively mixed with 2.8 g of the dissolved reaction product T (according to the invention) and 35 g of monofluorotrichloromethane as blowing agent using a laboratory stirrer.

This mixture was foamed with 148 g of crude 4,4'-diisocyanatodiphenylmethane. A rigid polyurethane foam was formed.

Foaming and physical data:
cream time (secs.): 8
gel time (secs.): 80
free gross density (kg/m$^3$): 22
cell pattern: very fine

EXAMPLE 6

90 g of a polyether having a hydroxyl number of 465 which had been obtained by addition of propylene oxide onto an aqueous sucrose solution, 10 g of a polyether having a hydroxyl number of 650 which had been obtained by addition of propylene oxide onto ethylene diamine, 2 g of a siloxane-polyether copolymer as foam stabilizer, 2 g of water and 2 g of dimethylcyclohexylamine were mixed.

100 g of this mixture were intensively mixed with 3 g of the dissolved reaction product K (according to the invention) and 35 g of monofluorotrichloromethane as blowing agent using a laboratory stirrer.

This mixture was foamed with 148 g of crude 4,4'-diisocyanatodiphenylmethane. A rigid polyurethane foam was formed.

Foaming and physical data:
cream time (secs.): 9
gel time (secs.): 70
free gross density (kg/m$^3$): 21
cell pattern: fine

EXAMPLE 7

90 g of a polyether having a hydroxyl number of 465 which had been obtained by addition of propylene oxide onto an aqueous sucrose solution, 10 g of a polyether having a hydroxyl number of 650 which had been obtained by addition of propylene oxide onto ethylene diamine, 2 g of a siloxane-polyether copolymer as foam stabilizer, 2 g of water and 2 g of dimethylcyclohexylamine were mixed.

100 g of this mixture were intensively mixed with 3 g of the dissolved reaction product M (according to the invention) and 35 g of monofluorotrichloromethane as blowing agent using a laboratory stirrer.

This mixture was foamed with 148 g of crude 4,4'-diisocyanatodiphenylmethane. A rigid polyurethane foam was formed.

Foaming and physical data:
cream time (secs.): 12
gel time (secs.): 82
free gross density (kg/m$^3$): 21
cell pattern: fine

EXAMPLE 8

60 g of a polyether having a hydroxyl number of 950 which had been obtained by addition of propylene oxide onto trimethylpropane, 40 g of a polyether having a hydroxyl number of 56 which had been obtained by addition of propylene oxide onto trimethylpropane, 0.5 g of water and 2 g of a siloxane-polyether copolymer as foam stabilizer were mixed.

100 g of this mixture were intensively mixed with 3 g of the dissolved reaction product T (according to the invention) and 10 g of monofluorotrichloromethane as blowing agent using a laboratory stirrer.

This mixture was foamed with 164 g of crude 4,4'-diisocyanatodiphenylmethane. A rigid, solid polyurethane plastic was formed.

Foaming and physical data:
cream time (secs.): 80
gel time (secs.): 130
free gross density (kg/m$^3$): 73
total gross density,
compressed (kg/m$^3$): 350
cell pattern: fine

EXAMPLE 9

91 g of a polyether having a hydroxyl number of 56 which had been obtained by addition of propylene oxide onto trimethylolpropane, 9 g of monoethylene glycol and 0.1 g of water were mixed.

100 g of this mixture were intensively mixed with 3 g of the dissolved reaction product T (according to the invention) and 15 g of monofluorotrichloromethane as blowing agent using a laboratory stirrer.

This mixture was foamed with 56 g of crude 4,4'-diisocyanatodiphenylmethane. A tough and elastic polyurethane foam was formed.

Foaming and physical data:
cream time (secs.): 35
gel time (secs.): 105
free gross density (kg/m³): 127
cell pattern: fine

EXAMPLE 10

100 g of a polyether having a hydroxyl number of 56 which had been obtained by addition of propylene oxide onto trimethylolpropane,
3 g of water,
1 g of a siloxane-polyether copolymer as foam stabilizer and
0.05 g of dibutyltin dilaurate were mixed.
100 g of this mixture were then intensively mixed with
2.5 g of the dissolved reaction product T (according to the invention) using a laboratory stirrer.

This mixture was foamed with 41 g of tolylene diisocyanate. A flexible polyurethane foam was formed.
Foaming and physical data:
cream time (secs.): 7
gel time (secs.): 90
free gross density (kg/m³): 30
cell pattern: fine

TABLE 1

| Reaction Product No. | Amine (10 moles) | Boric acid (moles) | Acid (moles) | | Resin |
|---|---|---|---|---|---|
| A | N,N—dimethylcyclohexylamine | 1 | techn. glutaric acid | (9) | low viscosity |
| B | N,N—dimethylcyclohexylamine | 1 | glutaric acid | (4.5) | low viscosity |
|   |   |   | succinic acid | (2.5) |   |
|   |   |   | adipic acid | (2.0) |   |
| C | N,N—dimethyl-N'—formyl-1,3-diaminopropane | 1 | tartaric acid | (9) | high viscosity |
| D | N,N—dimethylcyclohexylamine | 2 | techn. glutaric acid | (8) | low viscosity |
| E | N—methyl-N'—dimethylaminoethylpiperazine | 2 | techn. glutaric acid | (8) | low viscosity |
| F | N—methyl-N'—dimethylaminoethylpiperazine | 1 | techn. glutaric acid | (9) | medium viscosity |
| G | Diazabicycloundecene | 1 | 2-ethylhexanoic acid | (9) | low viscosity |
| H | Diazabicycloundecene | 2 | 2-ethylhexanoic acid | (8) | medium viscosity |

TABLE 2

| No. | Amine (10 moles) | Boric acid (moles) | Acid (moles) | | Solvent | Concentration (%) |
|---|---|---|---|---|---|---|
| J | Pentamethyldiethylenetriamine | 2 | adipic acid | (8) | DMSO | 50 |
| K | Pentamethyldiethylenetriamine | 2 | adipic acid | (8) | diethylene glycol | 80 |
| L | N,N—dimethyl-N'—formyl-1,3-di-aminopropane | 1 | tartaric acid | (9) | DMSO | 70 |
| M | 1,4-diazabicyclo-(2,2,2)-octane | 5 | glutaric acid | (5) | glycerol | 50 |
| N | 1,4-diazabicyclo-(2,2,2)-octane | 2 | ricinoleic acid | (8) | ethylene glycol | 50 |
| O | dimethylaminoethanol | 2 | stearic acid | (8) | DMF | 50 (>30° C.) |
| P | dimethylbenzylamine | 2 | acetic acid | (8) | DMSO | 50 (>30° C.) |
| Q | dimethylbenzylamine | 2 | acetic acid | (8) | diethylene glycol | 80 |
| R | tetramethylhexamethyldiamine | 2 | succinic acid | (8) | diethylene glycol | 50 (>30° C.) |
| S | triethylamine | 2 | propionic acid | (4) | ethylene glycol | 60 |
|   |   |   | glutaric acid | (4) |   |   |
| T | N,N—dimethylcyclohexylamine | 1 | glutaric acid, techn. | (9) | ethylene glycol | 70 |
| U | N,N—dimethylcyclohexylamine | 1 | glutaric acid, techn. | (9) | DMSO | 70 |
| V | N,N—dimethylcyclohexylamine | 2 | glutaric acid | (6) | DMSO | 50 |
|   |   |   | ricinoleic acid | (2) |   |   |
| W | N,N—dimethylcyclohexylamine | 2 | glutaric acid | (8) | dioxane | 80 |
| X | N—methyl-N'—dimethylaminoethyl-piperazine | 2 | glutaric acid, techn. | (6) | diethylene glycol | 50 |
|   |   |   | ricinoleic acid | (2) |   |   |
| Y | diazabicycloundecene | 1 | glutaric acid, techn. | (9) | ethylene glycol | 70 |
| Z | diazabicycloundecene | 1 | glutaric acid, techn. | (9) | DMSO | 70 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method for catalyzing the formation of isocyanate-based plastics comprising using as catalyst the reaction product of
   (a) tertiary amine with
   (b) a mixture of (i) boric acid and
(ii) a carboxylic acid.

2. The method of claim 1 in which the molar ratio of (a) to (b) is from 1:0.1 to 1:10.

3. The method of claim 1 in which the molar ratio of (a) to (b) is from 1:0.9 to 1:1.2.

4. The method of claim 1 in which the molar ratio of (i) to (ii) is from 1:100 to 1:0.01.

5. The method of claim 1 in which the molar ratio of (i) to (ii) is from 1:20 to 1:0.1.

6. The method of claim 1 in which the molar ratio of (i) to (ii) is from 1:15 to 1:1.

7. The method of claim 1 in which the tertiary amine (a) is selected from $C_1$–$C_4$-peralkyldiethylene triamine, N,N'-tetramethylhexamethylene diamine, dimethylethanolamine, N-methyl-N'-dimethylaminoethylpiperazine, dimethylbenzylamine, N-dimethyl-N'-formylethylene diamine, triethylamine and mixtures thereof.

8. The method of claim 1 in which the tertiary amine (a) is N,N-dimethylcyclohexylamine.

9. The method of claim 1 in which the carboxylic acid (ii) is a dicarboxylic acid.

10. The method of claim 1 in which the carboxylic acid (ii) is selected from succinic acid, glutaric acid, adipic acid and mixures thereof.

11. The method of claim 10 in which the anhydride of the carboxylic acid (ii) is present in the mixture (b).

12. The method of claim 1 using the catalyst dissolved in a solvent.

13. The method of claim 12 in which the solvent is glycerol or ethylene glycol.

* * * * *